C. LEWANDOWSKI.
APPARATUS FOR PREPARING COTTON.
No. 60,754. Patented Jan. 1, 1867.
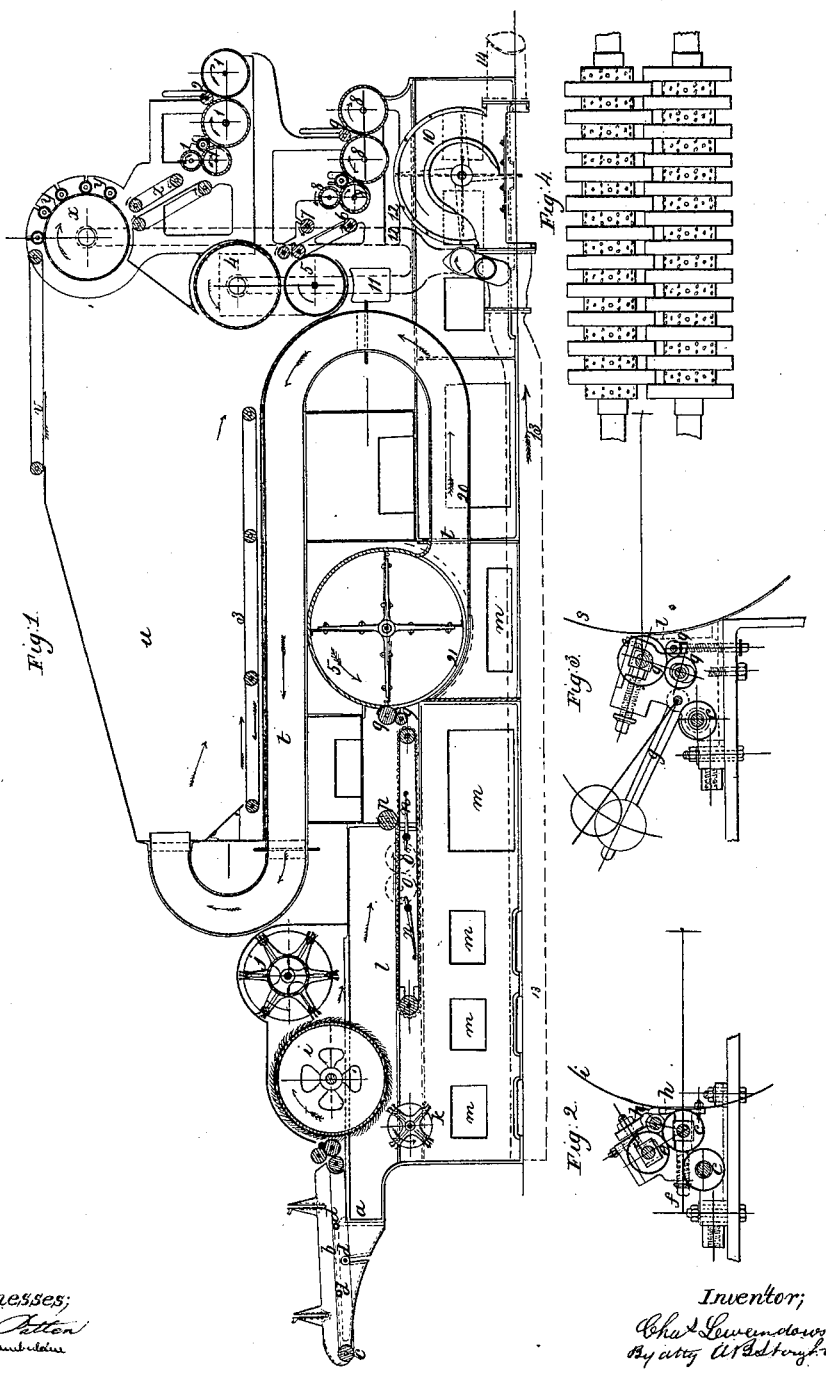

United States Patent Office.

CHARLES LEWANDOWSKI, OF PARIS, FRANCE, ASSIGNOR TO HIMSELF AND EMILE GRANIER, OF SAME PLACE.

Letters Patent No. 60,754, dated January 1, 1867.

IMPROVEMENT IN APPARATUS FOR PREPARING COTTON.

*The Schedule referred to in these Letters Patent and making part of the same.*

TO ALL WHOM IT MAY CONCERN:

Be it known that I, CHARLES LEWANDOWSKI, manufacturer, of Paris, France, have invented a Quadruple Apparatus for Preparing Cotton and other fibrous materials, (patented in France on the 1st August, 1863;) and I do hereby declare that the following is a full, clear, and exact description of the same, reference being had to the annexed sheet of drawings, making a part of the same, and which are hereafter more particularly referred to in detail, by reference to the drawings, in which—

Figure 1 represents a longitudinal section thereof.

Figures 2 and 3 show in detail the manner in which are fitted the feed-rollers.

Figure 4 shows a modification of the apparatus when the cotton is to be delivered in several strips instead of a continuous lap. The red arrows point out everywhere the progress of the cotton, or the direction in which are rotating the working parts.

In all these figures the same letters of reference indicate the like parts.

*a*, wood, sheet-iron, or cast-iron framing; it supports all the parts of the apparatus. *b*, endless apron intended to bring in the material by turning endlessly round the cylinder *c*. *d*, cylinders for guiding and supporting said apron *b*. *e e e*, three feed-cylinders, best shown in detail, fig. 2, in which figure one of the cylinders is fitted on bearings, the cushions of which are movable, and it is brought near to the others through the medium of a spiral spring, *f*. Should any extraneous body or cotton pad be engaged between the feed-rollers, the one which is movable will be moved aside and the extraneous body, &c., will pass out without any injury to any part of the machine. The feed-cylinders may be in greater number than described. *h*, stationary blade, the object of which is to fold the cotton fibres when presented to the working cylinder, for the purpose of having them well caught by the same, whatever may be, besides, the length of the fibre. *i*, working cylinder having a speed of one thousand to twelve hundred revolutions a minute; its surface is provided with a great number of inclined pins, describing, with the tangent, an angle of one hundred and eighty degrees. *j* and *k*, brushing ventilators, the wings of which are terminated by brushes which come close to the pins on said cylinder. These ventilators, *j* and *k*, have a speed superior to that of cylinder *i*, the one being intended to clean continually the said cylinder from beneath, and the other to project forth before it the staple on the apron *l*. *l*, endless apron made of hurdles, upon which travels the cotton which gets clear, as above said, of its impurities that drop down and are received in a receptacle through doors *m* formed in the framing. *n n*, beaters driven by the block-wheels, *o*; their function is to shake the hurdles or endless apron *l*, so as to facilitate the clearing off of the impurities. *p*, leading-roller for directing the cotton on the second set of feed-rollers. *q q q*, three feed-rollers or cylinders of the second set, better shown at fig. 3, where two of them are fitted on bearings with movable cushions, and forced against one another by spiral springs, whilst the other cylinder is likewise fitted on movable cushions in an eyelet-bearing, and held there close to the two others by the action of a weighted lever, *g*. In this manner, should any extraneous matter or cotton pad engage between the second feed-cylinders, it will pass without any detriment being caused to the machine, for the said cylinders will set apart so as to give way thereto. A greater number of these second cylinders may likewise be used. *r*, stationary blade or cutter for folding the cotton fibres as they are presented to the ventilating beating combing-cylinder, *s*, for the purpose of causing them to be snugly traversed by the blade points, whatever may be the shortness of the fibre. *s*, ventilator beater-comber, or the principal part of the apparatus, as producing a threefold effect, and performing the most efficient service. It consists of either four or eight wings, two or four of which being diametrical, are terminated by a series of small pins intended to comb the material, whilst the other two or four, likewise diametrical, are terminated plug-like, and are intended to beat the material after the comb-pallet has passed, whence it appears that by the arrangement of such organ as I have described, the cotton is first combed, then beaten by the pallets, which, each of them, fill the functions of both comber and beater; moreover, the great speed of this ventilator has the triple effect of projecting the fibres already combed and beaten in the distorted direction of a guide-duct, *t*, which will be described hereinafter. The combing-beating-ventilating apparatus may be provided with a greater number of arms or working parts; its upper part is surrounded by a closed drum, and its lower part by an open work for allowing of the dust and other extraneous matter dropping into a lower receptacle through a door, *m*, formed in the frame. *t*, distorted tinned sheet-iron tube or inside duct, for the purpose of diminishing the electric action which usually tends to be evolved by the frictions of filamentous fibres. The products being opened, cleaned, and sifted, traverse the duct, passing over a stationary sieve, 20, and, following the direction of the arrows, arrive at the classifying chamber. $u$, classifying chamber, in which are led the products, and where, finding a wide space, they get divided in two parts, the short lighter ones being projected in a mass to the ceiling, where they meet the endless apron $v$, which conveys them towards a perforated metallic wire cylinder, $x$, fixed at the end of the chamber $u$. This cylinder, assisted by the additional rollers $y$, furnishes a first lap to the delivering and compressing endless rollers, $z$. 1, series of compressing rollers, between which passes the formed lap as it leaves off the cylinders $x$ and $y$, and previous to its being rolled up on the beam 2. The long products drop down on the floor of said chamber $u$, where they are laid on the endless cloth, 3, which conveys them between two metallic wire cylinders, 4 and 5, also fitted at the end of the chamber $u$. These two cylinders supply a second lap, which passes on the endless cloth, 6, and beneath the compressor, 7, thence to be conveyed between another series of compressing rollers, 8, previous to its being rolled up on the beam 9, or on the strip-cylinder. 10, ventilator; it exhausts the last dust from the perforated metallic wire lap-forming cylinders $x$, 4 and 5, through the ducts 11 and 12, and through the duct 14, thence to be projected out. To this ventilator, 10, is also fitted a tube, 13, which fetches lost escaped from the first working parts, either stationary or not, $i$, $j$, $k$, $l$, $s$, 21 and 20.

I will actually describe the working of the parts and the practical efficiency of the apparatus, reference being had to the demonstrative drawing annexed herein. Raw cotton conveyed by the first apron, $b$, is delivered by the first feed-cylinders, $e$ $e$ $e$, to the action of the working cylinder, which disaggregates the same, opens it, and begins to extract the extraneous bodies and crushed seed in it, on its passage through the feed-cylinders. During the rotary motion of the brush-ventilators $j$ and $k$, the grossest impurities are thrown out on the apron $l$, through the open parts of which they drop down into the lower compartment; their separation is facilitated by the exhausting ventilator 10, and the blocks $n$ $n$, which having imparted to them the most speedy rocking motion, strike alternately the hurdles constituting the apron $l$, but the cotton still continues being directed in a lap towards the second feed-cylinders, $q$ $q$, thence to get under the action of the principal devices, where it is submitted again to a last combing, beating, and ventilating action. The impurities are extracted therefrom by the comb-pallets, and dropped into a lower compartment through the metallic wire-work, 21, beneath the ventilating beating-comber $s$, whilst the fibres of the cotton are projected in the direction of the distorted duct, $t$, which leads them into the classifying chamber $u$, thence to form, as above explained, the first lap of short staple and the second lap of long staple. Now, on the whole course run by the filamentous cotton fibres, the impurities and other extraneous bodies will keep back and be laid down through the grates made closer and closer, and through the metallic wire cylinders $x$, 4 and 5, as above described. Thus will my preparing, purifying, separating apparatus suppress the previous passage of the cotton to two machines, and also the double passage through the threshing machine, the cotton being by such process completely purged, with both a saving of time and a reduction of waste amounting at least from fifteen to twenty per cent. on the preparations of the same as effected by the known machines. The speed of the various parts, and the net products obtained by my machine, depend on the dimensions and nature of the cotton submitted thereto.

I will now describe some modifications to my machine. When it is desired, instead of laps, as described, to obtain more strips, then would be substituted for the working parts $x$ $y$ $z$, 1 and 2, and for the organs 4 5 6 7 and 8, the arrangement shown at fig. 4. I mean strips being to be submitted to the spinning process, without any previous carding, chiefly short staple. 15 16 are metallic wire rollers, the circles of which slip into one another, the strips being formed into the empty perforated spaces, 18, to be afterwards delivered to driving compressing cylinders. The portions, 19, of the cylinders, are made of perforated metallic wire, for the air-passage which sucks up the staple in order to form it into strips, and also for the expulsion of the dust exhausted by the ventilator 10. My apparatus has, therefore, as well explained, manifold functions. It disaggregates, opens the material, then combs, beats, cleans, and classifies the same, which last function might be suppressed; but then the chamber $u$ should be suppressed too, and the duct $t$ made straight, and then at the entrance end of said duct $t$ should be established a lap-forming cylinder and compressing guide cylinders, or strip-forming cylinders, the latter constituting then a machine for producing strips to be delivered without any previous carding to the spinning process.

*Claims.*

Having thus fully described my invention, what I claim therein as new, and desire to secure by Letters Patent in a cotton-cleaning and fibre-classifying machine, is—

In combination with the double-combing and beating-cylinders, and the single air-duct for separating and classifying the fibres, the double-delivering mechanism for separately discharging the thus separated and classified fibres in laps or slivers, the whole operating in the manner substantially as and for the purpose described.

LEWANDOWSKI.

Witnesses:
 A. GUION,
 EDWARD TUCK.